United States Patent
Liang et al.

(10) Patent No.: US 11,685,824 B2
(45) Date of Patent: Jun. 27, 2023

(54) ETHYLENE-VINYL ALCOHOL COPOLYMER RESIN COMPOSITION, ETHYLENE-VINYL ALCOHOL COPOLYMER FILM FORMED THEREFROM, AND MULTILAYER STRUCTURE CONTAINING THE SAME

(71) Applicant: CHANG CHUN PETROCHEMICAL CO., LTD., Taipei (TW)

(72) Inventors: Chih Chieh Liang, Taipei (TW); Wen Hsin Lin, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/701,055

(22) Filed: Mar. 22, 2022

(65) Prior Publication Data

US 2022/0403147 A1 Dec. 22, 2022

(30) Foreign Application Priority Data

Jun. 16, 2021 (CN) ........................ 202110666706.1
Jun. 16, 2021 (TW) ................................ 110121916

(51) Int. Cl.
| | | |
|---|---|---|
| *C08L 23/08* | (2006.01) | |
| *C08L 29/04* | (2006.01) | |
| *B32B 7/12* | (2006.01) | |
| *B32B 27/08* | (2006.01) | |
| *B32B 27/30* | (2006.01) | |
| *B32B 27/32* | (2006.01) | |

(52) U.S. Cl.
CPC ............... *C08L 23/08* (2013.01); *B32B 7/12* (2013.01); *B32B 27/08* (2013.01); *B32B 27/306* (2013.01); *B32B 27/327* (2013.01); *C08L 29/04* (2013.01); *B32B 2250/02* (2013.01); *B32B 2250/24* (2013.01); *B32B 2307/7244* (2013.01); *B32B 2323/046* (2013.01); *B32B 2329/04* (2013.01); *B32B 2439/70* (2013.01); *B32B 2439/80* (2013.01); *C08L 2203/16* (2013.01)

(58) Field of Classification Search
CPC ........................... C08J 2329/04; C08F 216/06
See application file for complete search history.

(56) References Cited

U.S. PATENT DOCUMENTS

| | | | | |
|---|---|---|---|---|
| 5,196,469 A | * | 3/1993 | Cushing | .................. C08J 7/043 427/407.1 |
| 9,862,818 B2 | | 1/2018 | Nakazawa et al. | |
| 10,961,378 B1 | | 3/2021 | Lin et al. | |
| 2020/0339771 A1 | * | 10/2020 | Hasegawa | ............. B29C 55/005 |

FOREIGN PATENT DOCUMENTS

| | | |
|---|---|---|
| JP | H-11291244 A | 10/1999 |
| JP | H-11294947 A | 10/1999 |
| JP | 2010042687 A | 2/2010 |
| JP | 2018109173 A | 7/2018 |
| TW | 202102552 A | 1/2021 |
| WO | WO-3013187455 A1 | 12/2013 |
| WO | WO-2019039458 A1 | 2/2019 |

* cited by examiner

*Primary Examiner* — Jeffrey C Mullis
(74) *Attorney, Agent, or Firm* — Muncy, Geissler, Olds & Lowe, P C.

(57) ABSTRACT

The present invention relates to an ethylene-vinyl alcohol copolymer (EVOH) resin composition, an EVOH film formed therefrom, and a multilayer structure containing the same. The surface roughness of the EVOH resin composition is a kurtosis (Sku) ranging from 0.05 to 100. The EVOH of the invention can reduce the torque output during processing, and can obtain the EVOH film with excellent appearance.

11 Claims, No Drawings

ETHYLENE-VINYL ALCOHOL COPOLYMER RESIN COMPOSITION, ETHYLENE-VINYL ALCOHOL COPOLYMER FILM FORMED THEREFROM, AND MULTILAYER STRUCTURE CONTAINING THE SAME

BACKGROUND OF THE INVENTION

1. Technical Field

The present invention relates to an ethylene-vinyl alcohol copolymer (EVOH) resin composition. The EVOH resin composition has high surface uniformity, especially its surface roughness is a kurtosis (Sku) ranging from 0.05 to 100. The invention also discloses a film formed from the EVOH resin composition and a multilayer structure containing the EVOH resin composition.

2. Description of Related Art

EVOH resins are widely used in laminates for preserving perishable items. For example, EVOH resins and laminates are commonly used by the food packaging industry, medical device and supplies industry, pharmaceutical industry, electronics industry, and agrochemical industry. EVOH resins are often incorporated as a distinct layer within a laminate to serve as an oxygen-barrier layer.

The conventional EVOH pellets made of EVOH resin have large surface roughness and high friction between pellets, resulting in extremely high torque during EVOH processing. Although the processability of EVOH was adjusted by adding slip agent in the past, there is still a need for further improvement.

BRIEF SUMMARY OF THE INVENTION

In view of the continuous demand for EVOH resin that can reduce the torque output during processing and achieve high surface uniformity.

The present invention relates to an ethylene-vinyl alcohol copolymer (EVOH) resin composition having high surface uniformity, wherein the EVOH resin composition includes an ethylene-vinyl alcohol copolymer resin, for example, the surface roughness of the EVOH resin composition is a kurtosis (Sku) ranging from 0.05 to 100. In addition, the surface roughness of the EVOH resin composition may further be a root mean square height (Sq) of 0.003 to 4 μm, a protruding crest height (Spk) of 0.005 to 5 μm, and/or a maximum surface height (Sz) of 0.015 to 10 μm.

In a non-limiting example, the moisture content of the ethylene-vinyl alcohol copolymer resin composition is less than or equal to 1 wt %.

Additionally or alternatively, the EVOH resin composition may be in the form of pellet(s), film(s), fiber(s), and the like. The EVOH resin composition can be used to prepare films or multilayer structures. The inventor found that by controlling the surface roughness of EVOH pellets, the torque output during EVOH processing can be reduced, and the film formed from the EVOH resin composition and the multilayer structure containing the EVOH resin composition can have an excellent appearance.

Additionally or alternatively, the maximum line height (Rz) of the surface of the EVOH resin composition is about 0.02-13 μm; or the Rz of the surface of the EVOH resin composition is 0.02-9.9 μm.

In another aspect of the present invention, an EVOH resin composition (or pellets thereof) that can have a boron content of 5 to 550 ppm is provided. The EVOH resin composition may have an alkali metal content of about 10 to 550 ppm. Additionally or alternatively, the EVOH resin composition may further include one or a combination selected from the group consisting of cinnamic acid, conjugated polyene, slip agent and alkaline earth metal.

Additionally or alternatively, the ethylene-vinyl alcohol copolymer resin in the EVOH resin composition may have a saponification degree of 99.5 mole % or higher. The ethylene-vinyl alcohol copolymer resin in the EVOH resin composition may have an ethylene content of about 20 to about 48 mole %. For example, the ethylene content of the ethylene-vinyl alcohol copolymer may be about 25 to about 45 mole %. The EVOH resin composition may be formed of two or more EVOHs having different ethylene contents.

According to at least one embodiment, the multilayer structure includes: (a) at least one layer formed of the aforementioned ethylene-vinyl alcohol copolymer resin; (b) at least one polymer layer; and (c) at least one adhesive layer. The polymer layer may be selected from the group consisting of a low-density polyethylene layer, a polyethylene grafted maleic anhydride layer, a polypropylene layer, and a nylon layer, for example. The adhesive layer is a tie layer.

DETAILED DESCRIPTION OF THE INVENTION

The present invention relates to an ethylene-vinyl alcohol copolymer (EVOH) resin composition. The EVOH resin composition has low surface roughness, especially the surface roughness is a kurtosis (Sku) ranging from 0.05 to 100. In addition, the surface roughness of the EVOH resin composition may further be a root mean square height (Sq) of 0.003 to 4 μm, a protruding crest height (Spk) of 0.005 to 5 μm, and/or a maximum surface height (Sz) of 0.015 to 10 μm. The surface roughness of the EVOH resin composition can be controlled by using different dryers and adjusting the temperature and humidity in three stages during the drying stage of the EVOH process, so that the EVOH resin composition and the film formed therefrom have good effects. The EVOH resin composition can be used to prepare films or multilayer structures. The inventor found that by controlling the surface roughness parameter Sku of EVOH pellets within a specific range, the torque output during EVOH processing can be reduced, and the gel formation of the film and multilayer structure formed by it can be improved.

The kurtosis (Sku) or sharpness is the kurtosis of the surface, and its definition refers to ISO 25178:2012. The Sku is a parameter used to judge the sharpness of the roughness shape. The Sku can be, for example, between 0.05 and 100, between 0.05 and 90, between 0.05 and 80, between 0.05 and 70, between 0.05 and 60, between 0.05 and 50, between 0.05 and 40, between 0.05 and 30, between 0.05 and 20, between 0.05 and 10, between 0.1 and 100, between 0.1 and 90, between 0.1 and 80, between 0.1 and 70, between 0.1 and 60, between 0.1 and 50, between 0.1 and 40, between 0.1 and 30, between 0.1 and 20, between 0.1 and 10, between 5 and 100, between 5 and 90, between 5 and 80, between 5 and 70, between 5 and 60, between 5 and 50, between 5 and 40, between 5 and 30, between 5 and 20, between 5 and 10, between 15 and 100, between 15 and 90, between 15 and 80, between 15 and 70, between 15 and 60, between 15 and 50, between 15 and 40, between 35 and 100, between 35 and 90, between 35 and 80, between 35 and 70, between 35 and 60, between 55 and 100, between 55 and 90, between 55 and 80, or between 75 and 100.

The root mean square height (Sq) is the root mean square height of the surface, and its definition refers to ISO 25178: 2012. The Sq defines the root mean square of the height of each point in a specific range, which is equivalent to the standard deviation of the height. The Sq can be, for example, between 0.003 and 4 µm, between 0.003 and 3.5 µm, between 0.003 and 3 µm, between 0.003 and 2.5 µm, between 0.003 and 2 µm, between 0.003 and 1.5 µm, between 0.003 and 1 µm, between 0.003 and 0.5 µm, between 0.003 and 0.1 µm, between 0.003 and 0.05 µm, between 0.005 and 4 µm, between 0.005 and 3.5 µm, between 0.005 and 3 µm, between 0.005 and 2.5 µm, between 0.005 and 2 µm, between 0.005 and 1.5 µm, between 0.005 and 1 µm, between 0.005 and 0.5 µm, between 0.005 and 0.1 µm, between 0.005 and 0.05 µm, between 0.05 and 4 µm, between 0.05 and 3.5 µm, between 0.05 and 3 µm, between 0.05 and 2.5 µm, between 0.05 and 2 µm, between 0.05 and 1.5 µm, between 0.05 and 1 µm, between 0.05 and 0.5 µm, between 0.1 and 4 µm, between 0.1 and 3.5 µm, between 0.1 and 3 µm, between 0.1 and 2.5 µm, between 0.1 and 2 µm, between 0.1 and 1.5 µm, between 0.1 and 1 µm, between 0.1 and 0.5 µm, between 1 and 4 µm, between 1 and 3.5 µm, between 1 and 3 µm, between 1 and 2.5 µm, between 1 and 2 µm, between 1 and 1.5 µm, between 2 and 4 µm, between 2 and 3.5 µm, between 2 and 3 µm, between 2.8 and 4 µm, between 2.8 and 3.5 µm, or between 2.8 and 3.3 µm.

The definition of the protruding crest height (Spk) refers to ISO 25178:2012. The Spk refers to the average height of the protruding crest. The Spk can be, for example, between 0.005 and 5 µm, between 0.005 and 4.5 µm, between 0.005 and 4 µm, between 0.005 and 3.5 µm, between 0.005 and 3 µm, between 0.005 and 2.5 µm, between 0.005 and 2 µm, between 0.005 and 1.5 µm, between 0.005 and 1 µm, between 0.005 and 0.5 µm, between 0.005 and 0.1 µm, between 0.005 and 0.05 µm, between 0.005 and 0.01 µm, between 0.01 and 5 µm, between 0.01 and 4.5 µm, between 0.01 and 4 µm, between 0.01 and 3.5 µm, between 0.01 and 3 µm, between 0.01 and 2.5 µm, between 0.01 and 2 µm, between 0.01 and 1.5 µm, between 0.01 and 1 µm, between 0.01 and 0.5 µm, between 0.1 and 5 µm, between 0.1 and 4.5 µm, between 0.1 and 4 µm, between 0.1 and 3.5 µm, between 0.1 and 3 µm, between 0.1 and 2.5 µm, between 0.1 and 2 µm, between 0.1 and 1.5 µm, between 0.1 and 1 µm, between 0.1 and 0.5 µm, between 0.5 and 5 µm, between 0.5 and 4.5 µm, between 0.5 and 4 µm, between 0.5 and 3.5 µm, between 0.5 and 3 µm, between 0.5 and 2.5 µm, between 0.5 and 2 µm, between 0.5 and 1.5 µm, between 0.5 and 1 µm, between 1.5 and 5 µm, between 1.5 and 4.5 µm, between 1.5 and 4 µm, between 1.5 and 3.5 µm, between 1.5 and 3 µm, between 1.5 and 2.5 µm, between 1.5 and 2 µm, between 2.5 and 5 µm, between 2.5 and 4.5 µm, between 2.5 and 4 µm, between 2.5 and 3.5 µm, between 3 and 5 µm, between 3 and 4.5 µm, between 3 and 4 µm, between 3 and 3.5 µm, between 3.5 and 5 µm, between 3.5 and 4.5 µm, between 3.5 and 4 µm, or between 4 and 5 µm.

The maximum surface height (Sz) is the maximum height of the surface, and its definition refers to ISO 25178:2012. The Sz defines the sum of the maximum peak height and the maximum valley depth in a specific range. The Sz can be, for example, between 0.015 and 10 µm, between 0.015 and 9 µm, between 0.015 and 8 µm, between 0.015 and 7 µm, between 0.015 and 6 µm, between 0.015 and 5 µm, between 0.015 and 4 µm, between 0.015 and 3 µm, between 0.015 and 2 µm, between 0.015 and 1 µm, between 0.015 and 0.1 µm, between 0.015 and 0.01 µm, between 0.02 and 10 µm, between 0.02 and 9 µm, between 0.02 and 8 µm, between 0.02 and 7 µm, between 0.02 and 6 µm, between 0.02 and 5 µm, between 0.02 and 4 µm, between 0.02 and 3 µm, between 0.02 and 2 µm, between 0.02 and 1 µm, between 0.02 and 0.1 µm, between 0.5 and 10 µm, between 0.5 and 9 µm, between 0.5 and 8 µm, between 0.5 and 7 µm, between 0.5 and 6 µm, between 0.5 and 5 µm, between 0.5 and 4 µm, between 0.5 and 3 µm, between 0.5 and 2 µm, between 0.5 and 1 µm, between 1 and 10 µm, between 1 and 9 µm, between 1 and 8 µm, between 1 and 7 µm, between 1 and 6 µm, between 1 and 5 µm, between 1 and 4 µm, between 1 and 3 µm, between 1.5 and 10 µm, between 1.5 and 9 µm, between 1.5 and 8 µm, between 1.5 and 7 µm, between 1.5 and 6 µm, between 1.5 and 5 µm, between 1.5 and 4 µm, between 1.5 and 3 µm, between 2.5 and 10 µm, between 2.5 and 9 µm, between 2.5 and 8 µm, between 2.5 and 7 µm, between 2.5 and 6 µm, between 2.5 and 5 µm, between 2.5 and 4 µm, between 3.5 and 10 µm, between 3.5 and 9 µm, between 3.5 and 8 µm, between 3.5 and 7 µm, between 3.5 and 6 µm, between 3.5 and 5 µm, between 4.5 and 10 µm, between 4.5 and 9 µm, between 4.5 and 8 µm, between 4.5 and 7 µm, between 4.5 and 6 µm, between 5.5 and 10 µm, between 5.5 and 9 µm, between 5.5 and 8 µm, between 5.5 and 7 µm, between 6.5 and 10 µm, between 6.5 and 9 µm, between 6.5 and 8 µm, between 7.5 and 10 µm, between 7.5 and 9 µm, between 8.5 and 10 µm, or between 8.5 and 9.7 µm.

In one aspect, the present invention provides an EVOH resin composition. The EVOH resin composition may be in the form of pellet(s), film(s), fiber(s) and the like. The EVOH pellets mentioned herein refer to the form and/or shape of one or more pellets of the EVOH resin composition after pelletization. Although the EVOH resin composition that is pelletized to form one or more EVOH pellets is described throughout the present invention, the EVOH resin composition can also be processed into the form of beads, cubes, chips, shavings, and the like. In some embodiments, the EVOH resin composition is in the pellet form. The so-called pellet form can be columnar, granular or flat, wherein the granular shape can be round, elliptical, chess-shaped, or rugby-shaped, and the columnar shape can be cylindrical, elliptical columnar, or angular columnar.

When the EVOH pellets are in the round particle shape, the round particle shape can be round shape, elliptical shape, or Go-shape, where the maximum outer diameter of the pellet is taken as the long side, and the maximum diameter in the cross section with the largest area in the cross section perpendicular to the long side is taken as the short side. Its long side can be 1.5-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 2.0-4.5 mm, 2.0-4.4 mm, 2.0-4.2 mm, 2.0-4.0 mm, 2.0-3.8 mm, 2.0-3.6 mm, 2.0-3.4 mm, 2.0-3.2 mm, or 2.0-3.0 mm; and its short side can be 1.5-5.0 mm, 1.8-4.6 mm, 2.4-4.6 mm, 2.6-4.6 mm, 2.8-4.6 mm, 3.0-4.6 mm, 3.2-4.6 mm, 3.4-4.6 mm, 3.6-4.6 mm, 3.8-4.6 mm, 4.0-4.6 mm, 1.6-4.5 mm, 1.6-4.4 mm, 1.6-4.2 mm, 1.6-4.0 mm, 1.6-3.8 mm, 1.6-3.6 mm, 1.6-3.4 mm, 1.6-3.2 mm, or 1.6-3.0 mm.

When EVOH pellets are cylindrical or elliptical columnar, the height can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm; and the long axis of its cross-sectional area can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm.

The surface roughness characteristics of the EVOH resin composition can also be described by the maximum line height (Rz) of the surface, and its definition standard refers to JIS B 0601-2001. The Rz is the sum of the height of the highest crest and the depth of the deepest trough in the profile curve on the reference length.

In one embodiment, the maximum line height (Rz) of the surface of the EVOH resin composition may be 0.02-13 μm, 0.02-12 μm, 0.02-11 μm, 0.02-10 μm, 0.02-9 μm, 0.02-8 μm, 0.02-7 μm, 0.02-6 μm, 0.02-5 μm, 0.02-4 μm, 0.02-3 μm, 0.02-2 μm, 0.02-1 μm, 0.02-0.1 μm, 0.1-13 μm, 0.1-12 μm, 0.1-11 μm, 0.1-10 μm, 0.1-9 μm, 0.1-8 μm, 0.1-7 μm, 0.1-6 μm, 0.1-5 μm, 0.1-4 μm, 0.1-3 μm, 0.1-2 μm, 0.1-1 μm, 1-13 μm, 1-12 μm, 1-9 μm, 1-8 μm, 1-7 μm, 1-6 μm, 1-5 μm, 1-4 μm, 1-3 μm, 1-2 μm, 5-13 μm, 5-12 μm, 5-11 μm, 5-10 μm, 5-9 μm, 5-8 μm, 5-7 μm, 7-13 μm, 7-12 μm, 7-11 μm, 7-10 μm, 7-9 μm, 7-8 μm, 8-13 μm, 8-12 μm, 8-11 μm, 8-10 μm, 8-9 μm, 10-13 μm, or 10-12 μm. In a preferred embodiment, the Rz of the surface is about 0.02 to about 9.9 μm.

The EVOH pellets are formed by an EVOH with an ethylene content. For example, the ethylene content of the EVOH can range from about 20 to about 48 mole %, from about 20 to about 45 mole %, from about 25 to about 45 mole %, from about 28 to about 42 mole %, or from about 30 to about 40 mole %. The EVOH resin composition can be formed from two or more EVOHs having different ethylene contents. For example, the ethylene content of one of the EVOHs may be in the range of about 20 to about 35 mole %, such as about 24 to about 35 mole %, about 28 to about 35 mole %, about 20 to about 32 mole %, about 24 to about 32 mole %, about 28 to about 32 mole %, about 20 to about 30 mole %, or about 24 to about 30 mole %. Additionally or alternatively, the ethylene content of one of the EVOHs may be in the range of about 36 to about 48 mole %, such as about 40 to about 48 mole %, about 44 to about 48 mole %, about 36 to about 45 mole %, or about 40 to about 45 mole %. However, in some preferred embodiments, the EVOH resin composition is formed of a single EVOH having an ethylene content of about 20 to about 48 mole %.

Additionally or alternatively, the degree of saponification of the EVOH in the EVOH resin composition may be 90 mole % or higher, preferably 95 mole % or higher, preferably 97 mole % or higher, preferably 99.5 mole % or higher.

The EVOH resin composition may contain boron compounds and/or boric acid and/or cinnamic acid and/or alkali metals and/or conjugated polyenes and/or slip agents and/or alkaline earth metals, salts thereof, and/or mixtures thereof in some cases. The above-mentioned materials can impart better properties to the EVOH resin composition.

In another aspect of the present invention, there is provided an EVOH resin composition (or pellets thereof), which may comprise an ethylene-vinyl alcohol copolymer and a boron compound, wherein the boron content of the EVOH resin composition is about 5-550 ppm. In some cases, the boron content of the EVOH resin composition may be about 5-550 ppm, about 5-500 ppm, about 5-450 ppm, about 5-400 ppm, about 5-350 ppm, about 5-300 ppm, about 5-250 ppm, about 5-200 ppm, about 5-150 ppm, about 5-100 ppm, about 5-50 ppm, about 10-550 ppm, about 10-500 ppm, about 10-450 ppm, about 10-400 ppm, about 10-350 ppm, about 10-300 ppm, about 10-250 ppm, about 10-200 ppm, about 10-150 ppm, about 10-100 ppm, about 10-50 ppm, about 50-550 ppm, about 50-500 ppm, about 50-450 ppm, about 50-400 ppm, about 50-350 ppm, about 50-300 ppm, about 50-250 ppm, about 50-200 ppm, about 50-150 ppm, about 50-100 ppm, about 100-550 ppm, about 100-500 ppm, about 100-450 ppm, about 100-400 ppm, about 100-350 ppm, about 100-300 ppm, about 100-250 ppm, about 100-200 ppm, about 100-150 ppm, about 200-550 ppm, about 200-500 ppm, about 200-450 ppm, about 200-400 ppm, about 200-350 ppm, about 200-300 ppm, about 200-250 ppm, about 300-550 ppm, about 300-500 ppm, about 300-450 ppm, about 300-400 ppm, about 300-350 ppm, about 400-550 ppm, about 400-500 ppm, about 400-450 ppm, or about 500-550 ppm based on the total weight of the EVOH resin composition. Without being limited to any specific theory, it is believed that adding a boron compound to the EVOH resin composition and making the boron content of EVOH be 5 to 550 ppm reduces or eliminates the adhesion of the EVOH resin composition during the extrusion process through the screw extruder, and further improves the thickness uniformity and flexibility of the film. In some cases, such EVOH resin composition can clean the screw extruder by removing or at least partially removing the EVOH resin previously adhered to the inner surface of the screw extruder during the extrusion process, so that the material has a self-cleaning function, which can further improve the film thickness uniformity.

The boron compound may, in some instances, include boric acid or a metal salt thereof. Examples of the metal salt include, but are not limited to, calcium borate, cobalt borate, zinc borate (e.g., zinc tetraborate or zinc metaborate), potassium aluminum borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., copper (II) borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganese (I) borate, manganese metaborate, or manganese tetraborate), lithium borate (e.g., lithium metaborate, lithium tetraborate, or lithium pentaborate), salts thereof, or combinations thereof. Borate mineral such as borax, kainite, inyonite, kotoite, suanite, azaibelyite, and szaibelyite may be included. Of these, borax, boric acid, and sodium borate such as sodium metaborate, sodium diborate, sodium tetraborate, sodium pentaborate, sodium hexaborate, and sodium octaborate are preferably used.

In some cases, the EVOH resin composition may further include alkali metals. The alkali metal source for the EVOH resin composition of the present invention to contain the above-mentioned alkali metal includes alkali metal compounds such as alkali metal oxides, alkali metal hydroxides, and alkali metal salts. They are preferably water-soluble. Among them, from the viewpoint of dispersibility, alkali metal salts are preferred. Examples of alkali metal salts include inorganic salts such as alkali metal carbonate, bicarbonate, phosphate, borate, sulfate, and chloride salt; alkali metal acetate, butyrate, propionate, heptanoate, caprate, and other monocarboxylates with carbon numbers from 2 to 11;

alkali metal oxalate, malonate, succinate, adipate, suberate, sebacate and other dicarboxylates with carbon numbers from 2 to 11; and the carboxylate of the polymerized terminal carboxyl group of EVOH. These can be used alone or in combination of two or more.

The alkali metals used in the present invention include lithium, sodium, potassium, rubidium, and cesium. These can be used alone or in combination of two or more. Among them, sodium and potassium are preferred, and sodium is particularly preferred.

The EVOH resin composition may have an alkali metal content of about 10-550 ppm, and the alkali metal content may be, for example, 10-550 ppm, about 10-500 ppm, about 10-450 ppm, about 10-400 ppm, about 10-350 ppm, about 10-300 ppm, about 10-250 ppm, about 10-200 ppm, about 10-150 ppm, about 10-100 ppm, about 10-50 ppm, about 50-550 ppm, about 50-500 ppm, about 50-450 ppm, about 50-400 ppm, about 50-350 ppm, about 50-300 ppm, about 50-250 ppm, about 50-200 ppm, about 50-150 ppm, about 50-100 ppm, about 100-550 ppm, about 100-500 ppm, about 100-450 ppm, about 100-400 ppm, about 100-350 ppm, about 100-300 ppm, about 100-250 ppm, about 100-200 ppm, about 100-150 ppm, about 200-550 ppm, about 200-500 ppm, about 200-450 ppm, about 200-400 ppm, about 200-350 ppm, about 200-300 ppm, about 200-250 ppm, about 300-550 ppm, about 300-500 ppm, about 300-450 ppm, about 300-400 ppm, about 300-350 ppm, about 400-550 ppm, about 400-500 ppm, about 400-450 ppm, or about 500-550 ppm.

Additionally or alternatively, the EVOH resin composition may further include one or a combination of cinnamic acid, conjugated polyene, slip agent and alkaline earth metal, or a salt thereof and/or a mixture thereof. The above-mentioned substances are common substances usually present in the EVOH resin composition, giving it better properties. If the content of the conjugated polyene in the EVOH resin composition per unit weight is 1 to 30000 ppm, the coloration after heating can be further suppressed and the thermal stability can be improved. If the content of the alkali metal compound or alkaline earth metal compound in the EVOH resin composition per unit weight is 1 to 1000 ppm in terms of metal, the long-term operation formability can be improved.

The conjugated polyene is, for example, but not limited to, a conjugated diene composed of a conjugated structure of 2 carbon-carbon double bonds, such as isoprene, 2,3-dimethyl-1,3-butadiene, 2-tert-butyl-1,3-butadiene, 1,3-pentadiene, 2,4-dimethyl-1,3-pentadiene, 3,4-dimethyl-1,3-pentadiene, 3-ethyl-1,3-pentadiene, 2-methyl-1,3-pentadiene, 4-methyl-1,3-pentadiene, 1,3-hexadiene, 2,5-dimethyl-2,4-hexadiene, 1,3-octadiene, 1,3-cyclopentadiene, 1,3-cyclohexadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, tropone, ocimene, ferrandrene, myrcene, farnesene, sorbic acids (e.g., sorbic acid or sorbate), or abietic acid; or a conjugated triene composed of a conjugated structure of 3 carbon-carbon double bonds, such as 2,4,6-octatriene-1-carboxylic acid, eleostearic acid, tung oil, or cholecalciferol. The conjugated polyene may be used in combination of two or more. Preferable conjugated polyenes are sorbic acids such as sorbic acid and sorbate.

The slip agent used in the present invention may include higher fatty acids, such as higher fatty acid (e.g., oleic acid, lauric acid, palmitic acid, myristic acid, stearic acid, or docosanoic acid); metal salt of higher fatty acid (e.g., aluminum, calcium, zinc, magnesium, or barium salt of the above-mentioned higher fatty acid); ester of higher fatty acid (e.g., methyl, isopropyl, butyl, or octyl ester of the above-mentioned higher fatty acid); saturated higher fatty acid amide (e.g., stearic acid amide or docosanoic acid amide); unsaturated higher fatty acid amide (e.g., oleic acid amide or erucamide); or double higher fatty acid amide (e.g., vinyl bis-stearyl amide, vinyl bis-oleic acid amide, vinyl bis-erucamide, or vinyl bis-lauric acid amide). These can be used alone or in combination of two or more.

The EVOH resin composition of the present invention usually has a specific range of moisture content. For example, the moisture content of the EVOH resin composition is evaluated by volatile content. The moisture content of the EVOH resin composition can be less than or equal to 1 wt %, less than 0.9%, less than 0.8%, less than 0.7%, less than 0.6%, less than 0.5%, less than 0.4%, less than 0.3%, less than 0.2%, less than 0.1%, between 0.01 and 1 wt %, between 0.08 and 1 wt %, or between 0.05 and 1 wt %. It was unexpectedly discovered that the moisture content of the EVOH resin composition must be controlled within a certain range, otherwise excessively high moisture content will cause bubbles, uneven film thickness and increased flow marks in the film or multilayer structure formed by the EVOH resin composition, causing problems in subsequent processing. Volatile content: The final EVOH pellets prepared were analyzed using method of ISO 14663-2 Annex A.

The EVOH resin composition is beneficial to more efficiently prepare the EVOH film formed therefrom. Suitable methods and equipment for preparing the EVOH film may include methods and equipment easily understood by those skilled in the art. The inventor believes that by controlling the surface roughness of the EVOH resin composition, the EVOH resin composition can reduce the torque in the extruder, and can also reduce the gel production of the film or multilayer structure formed by the EVOH resin composition, and improve the appearance of the film or multilayer structure formed by the EVOH resin composition.

In yet another aspect, the present invention provides a multilayer structure having at least one layer formed from the EVOH resin composition of the present invention; at least one polymer layer; and at least one adhesive layer. The polymer layer can be selected from a low-density polyethylene layer, a polyethylene grafted maleic anhydride layer, a polypropylene layer, a nylon layer, and combinations thereof. The adhesive layer may be a tie layer, such as ARKEMA OREVAC 18729 from ARKEMA.

EXAMPLE

The following non-limiting examples of various aspects of the present invention are provided mainly to illustrate the various aspects of the invention and the benefits derived therefrom.

Example 1

A non-limiting preparation method of EVOH pellets formed from the EVOH resin composition is provided as follows. 6 non-limiting example EVOH resin compositions (Example EVOH 1-6) and 5 comparative example EVOH resin compositions (Comparative Example EVOH 1-5) were prepared according to a method similar to the method disclosed below. However, the specific methods for preparing Example EVOH 1-6 and Comparative Example EVOH 1-5 are generally different from the methods disclosed below in one or more aspects.

Example EVOH 1 Pellet 500 kg of vinyl acetate, 100 kg of methanol, 0.0585 kg of acetyl peroxide, and 0.015 kg of citric acid were put into a polymerization vessel equipped with a cooling coil. After temporarily replacing the inside of the polymerization vessel with nitrogen, it was replaced with ethylene until the pressure of ethylene reached 45 kg/cm$^2$. Under pressure of ethylene, the temperature was raised to 67° C. while stirring to start polymerization. Six hours after the start of the polymerization, when the polymerization rate reached 60%, 0.0525 kg of sorbic acid conjugated polyene as a polymerization inhibitor was added. Thus, an ethylene-vinyl acetate copolymer having an ethylene structural unit content of 44 mole % was obtained. Then, the reaction liquid containing the ethylene-vinyl acetate copolymer was supplied to the distillation tower, and methanol vapor was introduced from the lower part of the tower to remove unreacted vinyl acetate, thereby obtaining a methanol solution of the ethylene-vinyl acetate copolymer.

For Example EVOH 1, a component formed by polymerizing ethylene monomer and vinyl acetate monomer (i.e., ethylene-vinyl acetate copolymer, hereinafter referred to as "EVAC" polymer) was saponified to form EVOH.

Subsequently, EVOH was dissolved in a solution with a ratio of methanol to water of 60:40. The EVOH/methanol/water solution was placed at 60° C. for 1 hour to promote the dissolution of EVOH in the EVOH/methanol/water solution. The solid content of this EVOH/methanol/water solution was 41 wt %.

Then the solution of methanol, water and EVOH was pelletized through underwater pelletizing. Specifically, the solution of methanol, water and EVOH was pumped into the feed pipe using a pump at a flow rate of 120 L/min, and then fed into the input pipe with a diameter of 2.8 mm, and then cut with a rotary knife at 1500 rpm to obtain EVOH pellets. At the same time, 5° C. circulating condensate water was used to cool EVOH pellets. Subsequently, the EVOH pellets were centrifuged to separate EVOH particles. The separated EVOH particles were washed with water and then immersed in a boric acid/sodium acetate solution. The concentration of the boric acid/sodium acetate solution was adjusted according to the boron content and alkali metal content of the final product listed in Table 1. Finally, the EVOH particles were dried in three stages using different dryers and added with calcium stearate to obtain EVOH round pellets with a long side of 3.0 mm and a short side of 2.4 mm. The so-called drying referred to drying in three stages using different dryers to obtain EVOH pellets. The first stage of drying used a flow dryer, which was a kind of turbulent dryer; in this stage, the drying temperature was 80° C., the drying time was 2 hours, and the humidity in the dryer was 50%. The second stage of drying used a belt dryer, which was a kind of static dryer; in this stage, the drying temperature was 100° C., the drying time was 20 hours, and the humidity in the dryer was 40%. The third stage of drying used an infrared dryer, which was a kind of static dryer; in this stage, the drying temperature was 120° C., the drying time was 20 hours, and the humidity in the dryer was 10%.

Example EVOH 2 Pellet

The EVOH pellets used in Example EVOH 2 were prepared using a process similar to that of Example EVOH 1 pellets. However, when preparing the EVOH pellets of Example EVOH 2, the first stage of drying used a flow dryer, which was a kind of turbulent dryer, where the drying temperature was 60° C., the drying time was 3 hours, and the humidity in the dryer was 70%; the second stage of drying used a belt dryer, which was a kind of static dryer, where the drying temperature was 100° C., the drying time was 15 hours, and the humidity in the dryer was 50%; and the third stage of drying used a microwave dryer, which was a kind of static dryer, where the drying temperature was 120° C., the drying time was 25 hours, and the humidity in the dryer was 0%.

Example EVOH 3 Pellet

The EVOH pellets used in Example EVOH 3 were prepared using a process similar to that of Example EVOH 1 pellets. However, the EVOH pellets of Example EVOH 3 were round pellets with a long side of 1.5 mm and a short side of 1.5 mm. In addition, when preparing the EVOH pellets of Example EVOH 3, the first stage of drying used a vertical dryer, which was a kind of turbulent dryer, where the drying temperature was 70° C., the drying time was 4 hours, and the humidity in the dryer was 80%; the second stage of drying used a box dryer, which was a kind of static dryer, where the drying temperature was 90° C., the drying time was 25 hours, and the humidity in the dryer was 60%; and the third stage of drying used a box dryer, which was a kind of static dryer, where the drying temperature was 110° C., the drying time was 30 hours, and the humidity in the dryer was 15%.

Example EVOH 4 Pellet

The EVOH pellets used in Example EVOH 4 were prepared using a process similar to that of Example EVOH 1 pellets. However, when preparing the EVOH pellets of Example EVOH 4, the first stage of drying used a microwave dryer, which was a kind of static dryer, where the drying temperature was 90° C., the drying time was 5 hours, and the humidity in the dryer was 20%; the second stage of drying used an infrared dryer, which was a kind of static dryer, where the drying temperature was 110° C., the drying time was 30 hours, and the humidity in the dryer was 30%; and the third stage of drying used a flow dryer, which was a kind of turbulent dryer, where the drying temperature was 100° C., the drying time was 10 hours, and the humidity in the dryer was 5%.

Example EVOH 5 Pellet

The EVOH pellets used in Example EVOH 5 were prepared using a process similar to that of Example EVOH 1 pellets. However, the EVOH pellets of Example EVOH 5 had an ethylene content of 28 mole %, and the Example EVOH 5 pellets were round pellets with a long side of 5 mm and a short side of 5 mm. In addition, when preparing the EVOH pellets of Example EVOH 5, the first stage of drying used a vertical dryer, which was a kind of turbulent dryer, where the drying temperature was 95° C., the drying time was 6 hours, and the humidity in the dryer was 60%; the second stage of drying used a microwave dryer, which was a kind of static dryer, where the drying temperature was 95° C., the drying time was 40 hours, and the humidity in the dryer was 80%; and the third stage of drying used a box dryer, which was a kind of static dryer, where the drying temperature was 115° C., the drying time was 15 hours, and the humidity in the dryer was 7%.

Example EVOH 6 Pellet

The EVOH pellets used in Example EVOH 6 were prepared using a process similar to that of Example EVOH 1 pellets. However, the EVOH pellets of Example EVOH 6 had an ethylene content of 28 mole %. In addition, when preparing the EVOH pellets of Example EVOH 6, the first stage of drying used a vertical dryer, which was a kind of turbulent dryer, where the drying temperature was 90° C., the drying time was 4 hours, and the humidity in the dryer was 80%; the second stage of drying used a box dryer, which was a type of static dryer, where the drying temperature was 100° C., the drying time was 35 hours, and the humidity in the dryer was 40%; and the third stage of drying used a microwave dryer, which was a kind of static dryer, where the drying temperature was 110° C., the drying time was 10 hours, and the humidity in the dryer was 5%.

Comparative Example EVOH 1 Pellet

The EVOH pellets used in Comparative Example EVOH 1 were prepared using a process similar to that of Example EVOH 1 pellets. However, when preparing the EVOH pellets of Comparative Example EVOH 1, the first stage of drying used a flow dryer, which was a kind of turbulent dryer, where the drying temperature was 110° C., the drying time was 1 hour, and the humidity in the dryer was 100%; the second stage of drying used a box dryer, which was a kind of static dryer, where the drying temperature was 100° C., the drying time was 25 hours, and the humidity in the dryer was 50%; and the third stage of drying used a vertical dryer, which was a kind of turbulent dryer, where the drying temperature was 105° C., the drying time was 20 hours, and the humidity in the dryer was 30%.

Comparative Example EVOH 2 Pellet

The EVOH pellets used in Comparative Example EVOH 2 were prepared using a process similar to that of Example EVOH 1 pellets. However, when preparing EVOH pellets of Comparative Example EVOH 2, the first stage of drying used a vertical dryer, which was a kind of turbulent dryer, where the drying temperature was 40° C., the drying time was 4 hours, and the humidity in the dryer was 40%; the second stage of drying used a box dryer, which was a kind of static dryer, where the drying temperature was 100° C., the drying time was 15 hours, and the humidity in the dryer was 40%; and the third stage of drying used a microwave dryer, which was a kind of static dryer, where the drying temperature was 90° C., the drying time was 20 hours, and the humidity in the dryer was 80%.

Comparative Example EVOH 3 Pellet

The EVOH pellets used in Comparative Example EVOH 3 were prepared using a process similar to that of Example EVOH 1 pellets. However, when preparing the EVOH pellets of Comparative Example EVOH 3, the first stage of drying used a box dryer, which was a kind of static dryer, where the drying temperature was 90° C., the drying time was 8 hours, and the humidity in the dryer was 90%; the second stage of drying used a belt dryer, which was a kind of static dryer, where the drying temperature was 120° C., the drying time was 18 hours, and the humidity in the dryer was 70%; and the third stage of drying used an infrared dryer, which was a kind of static dryer, where the drying temperature was 110° C., the drying time was 40 hours, and the humidity in the dryer was 10%.

Comparative Example EVOH 4 Pellet

The EVOH pellets used in Comparative Example EVOH 4 were prepared using a process similar to that of Example EVOH 1 pellets. However, when preparing the EVOH pellets of Comparative Example EVOH 4, the first stage of drying used a flow dryer, which was a kind of turbulent dryer, where the drying temperature was 100° C., the drying time was 5 hours, and the humidity in the dryer was 90%; the second stage of drying used an infrared dryer, which was a kind of static dryer, where the drying temperature was 110° C., the drying time was 30 hours, and the humidity in the dryer was 30%; and the third stage of drying used a box dryer, which was a kind of static dryer, where the drying temperature was 110° C., the drying time was 30 hours, and the humidity in the dryer was 20%.

Comparative Example EVOH 5 Pellet

The EVOH pellets used in Comparative Example EVOH 5 were prepared using a process similar to that of Example EVOH 1 pellets. However, the pellets of its EVOH resin composition were dried by blowing air at 77° C. at a flow rate of 0.7 m/s using a flow dryer for 1 hour, and after the moisture content of the pellets was reduced to 28%, a static dryer was used to blow nitrogen at 120° C. at a flow rate of 0.3 m/s and dry for 18 hours to obtain dry EVOH resin composition pellets with a moisture content of 0.15%. In other words, when preparing the EVOH pellets of Comparative Example EVOH 5, the first stage of drying used a flow dryer, which was a kind of turbulent dryer, where the drying temperature was 77° C. and the drying time was 1 hour; the second stage of drying was omitted; and the third stage of drying used a box dryer, which was a kind of static dryer, where the drying temperature was 120° C. and the drying time was 18 hours.

Example 2

The films were respectively formed using the pellets of Example EVOH 1 to 6 according to the following method. The pellets of Example EVOH 1 to 6 and that of Comparative Example EVOH 1 to 5 were sent to a single-layer T-die cast film extruder (optical control system MEV4) to prepare films. The thickness of the films formed from the pellets of Example EVOH 1 to 6 and the pellets of Comparative Example EVOH 1 to 5 were each 20 The temperature of the extruder was set at 220° C., and the temperature of the mold (i.e., T-die) was set at 230° C. The rotation frequency of the screw was 7 rpm (rotations/minutes).

Example 3

The pellets of Example EVOH 1 to 6 and the pellets of Comparative Example EVOH 1 to 5 were evaluated to judge the properties of these EVOH pellets and the films formed therefrom. As described above, the pellets of Example EVOH 1 to 6 were prepared according to a method similar to the method described in Example 1 above. However, the preparation methods of the pellets of Example EVOH 1 to 6 were different for the prepared EVOH pellets in terms of having different Sku, Sq, Spk, Sz, Rz, boron content or alkali metal content. The pellets of Comparative Example EVOH 1 to 5 were also prepared according to a method similar to that described in Example 1.

The average torque and current of the single screw extruder were further evaluated. The films were individually formed from Example EVOH 1 to 6 and Comparative Example EVOH 1 to 5 according to a method similar to that described in Example 2, and were evaluated to determine the size and amount of gel on the film.

The following Table 1 provides a summary of some attributes (i.e., Sku, Sq, Spk, Sz, Rz, boron content, alkali metal content, moisture content, average torque of extruder, and current of extruder) of the pellets of Example EVOH 1 to 6 and Comparative Example EVOH 1 to 5, as well as the conditions of gel generation on the EVOH films formed from Example EVOH 1 to 6 and Comparative Example EVOH 1 to 5.

was added to dissolve the substance. This hydrochloric acid solution was washed with ultrapure water and the volume was made up to 50 mL. The alkali metal content in this sample solution was determined by inductively coupled plasma atomic emission spectrometry (ICP-AES; 720-ES, Agilent Technology). Finally, the alkali metal content in the above-mentioned EVOH composition pellets was converted from the alkali metal concentration in the solution.

TABLE 1

|  | Example EVOH 1 | Example EVOH 2 | Example EVOH 3 | Example EVOH 4 | Example EVOH 5 | Example EVOH 6 |
| --- | --- | --- | --- | --- | --- | --- |
| Sku | 0.1 | 10.2 | 30.3 | 70.2 | 95.3 | 92.1 |
| Sq (μm) | 0.005 | 0.15 | 0.5 | 1.3 | 3.1 | 2.8 |
| Spk (μm) | 0.01 | 0.13 | 0.8 | 2 | 4.5 | 3.9 |
| Sz (μm) | 0.02 | 0.8 | 2.1 | 5.3 | 9.7 | 8.8 |
| Rz (μm) | 0.021 | 0.514 | 9.01 | 0.621 | 7.65 | 12.1 |
| boron content (ppm) | 10 | 120 | 40 | 500 | 300 | 80 |
| alkali metal content (ppm) | 20 | 70 | 130 | 450 | 320 | 360 |
| moisture content (%) | 1 | 0.01 | 1 | 0.05 | 0.3 | 0.1 |
| 0-100 μm gel | ○ | ○ | Δ | ○ | ○ | ○ |
| 100-200 μm gel | ○ | ○ | ○ | ○ | ○ | Δ |
| >200 μm gel | ○ | ○ | ○ | ○ | ○ | ○ |
| average torque of single screw extruder (Torque) | 15 | 18 | 31 | 20 | 25 | 52 |
| current of single screw extruder (Å) | 22 | 26.2 | 45.5 | 29.3 | 36.7 | 66.3 |

|  | Comparative Example EVOH 1 | Comparative Example EVOH 2 | Comparative Example EVOH 3 | Comparative Example EVOH 4 | Comparative Example EVOH 5 |
| --- | --- | --- | --- | --- | --- |
| Sku | 156.2 | 330.3 | 0.01 | 132.5 | 0.02 |
| Sq (μm) | 7.1 | 8.3 | 0.001 | 5.7 | 0.0015 |
| Spk (μm) | 38 | 55 | 0.003 | 7.3 | 0.001 |
| Sz (μm) | 21 | 35 | 0.01 | 11.3 | 0.005 |
| Rz (μm) | 11.05 | 29.73 | 0.011 | 7.44 | 0.01 |
| boron content (ppm) | 320 | 20 | 160 | 420 | 310 |
| alkali metal content (ppm) | 20 | 240 | 380 | 110 | 170 |
| 0-100 μm gel | ○ | ○ | X | ○ | ○ |
| 100-200 μm gel | X | X | Δ | X | X |
| >200 μm gel | Δ | X | Δ | ○ | Δ |
| average torque of single screw extruder (Torque) | 158 | 188 | 10 | 75 | 10 |
| current of single screw extruder (Å) | 231.7 | 275.7 | 10 | 88 | 10 |

The boron content of each Example and Comparative Example was measured by the following method. First, a sample of 0.1 g EVOH pellets was decomposed by concentrated nitric acid and microwave to make EVOH pellets form a sample solution. Then the sample solution was diluted with pure water to adjust its concentration to 0.75 mg/mL. The boron content in the sample solution was measured using inductively coupled plasma optical emission spectrometry (ICP-OES; iCAP7000, Thermo Fisher Scientific). The boron content refers to the measured value corresponding to the boron content derived from the boron compound used.

In addition, the alkali metal content in the EVOH pellets of the respective Examples and Comparative Examples was also measured. 2 g of the above-mentioned EVOH pellets were put into a platinum dish, added with a few milliliters of sulfuric acid, and then heated with a gas burner. After confirming that the pellets were carbonized and the sulfuric acid white smoke disappeared, the substance was added with a few drops of sulfuric acid and then heated again. This operation was repeated until the organic matter disappeared and the matter was completely ashed. After ashing, the platinum dish was cooled, and 1 mL of hydrochloric acid In order to evaluate the surface roughness of Example EVOH 1-6 pellets and Comparative Example EVOH 1-5 pellets, the EVOH pellets were placed flat on the board, and the surface roughness of the pellets was measured. When measuring, it was necessary to exclude the part with an inclination greater than 0.5 to ensure that the scanning plane was relatively horizontal. Inclination=Maximum surface height Sz/Side length of the analysis range (i.e., 129 μm). The laser microscope was LEXT OLS5000-SAF manufactured by Olympus, and the image was made at an air temperature of 24±3° C. and a relative humidity of 63±3%. The filter was set to no filter. The light source was a light source with a wavelength of 405 nm. The objective lens was a 100× magnifying glass (MPLAPON-100×LEXT). The optical zoom was set to 1.0×. The image area was set to 129 μm×129 μm. (When measuring Rz, the center line of the image area was taken.) The resolution was set to 1024 pixels×1024 pixels. The value of 100 pellets was measured and the average value was taken. Among them, Sku was measured by the method of ISO 25178:2012, and Rz was measured by the method of JIS B 0601-2001.

Calculation of the torque and current of the extruder during the processing of Example EVOH 1-6 and Comparative Example EVOH 1-5: When EVOH pellets were extruded with the single screw extruder (model: ME25/5800V4, brand: OCS), the torque value and current value of the extruder were measured. The extrusion conditions were as follows: the screw temperature was Zone1 195° C., Zone2 215° C., Zone3 220° C., Zone4 230° C., and Zone5 230° C.; and the screw speed was 7 rpm. The calculation time was 10 to 60 minutes, and 1 point was recorded every 1 minute, and then the average value was calculated.

The results show that Example EVOH 1 to 6 had lower torque output (15 to 33 Torque) and current (22 to 47 Å), showing that Example EVOH 1 to 6 showed excellent processing torque output.

In addition, the gel formation of the films formed by Example EVOH 1-6 and Comparative Example EVOH 1-5 was calculated. After EVOH was processed into a single-layer film, the FSA-100 film quality test system was used to analyze the amount of gel on the single-layer film, and the gel formation was evaluated based on the evaluation criteria. If the number of gels of <100 µm was less than 450, "○" was marked as "excellent"; if the number of gels of <100 µm was 450-1000, "Δ" was marked as "acceptable"; and if the number of gels of <100 µm was more than 1000, "×" was marked as "poor". If the number of gels of 100-200 µm was less than 50, "○" was marked as "excellent"; if the number of gels of 100-200 µm was 50-100, "Δ" was marked as "acceptable"; and if the number of gels of 100-200 µm was more than 100, "×" was marked as "poor". If the number of gels of >200 µm was less than 10, "○" was marked as "excellent"; if the number of gels of >200 µm was 10-20, "Δ" was marked as "acceptable"; and if the number of gels of >200 µm was more than 20, "×" was marked as "poor".

On the films formed by Example EVOH 1 to 6, the number of gels of <100 µm is less than 1000, the number of gels of 100-200 µm is less than 100, and the number of gels of >200 µm is less than 20, showing excellent appearance characteristics.

The inventor found that if the surface roughness of EVOH pellets is too high, when the pellets are processed by a single screw and friction occurs, local overheating is likely to cause cross-linking, and large gels are likely to be generated during processing. If the surface roughness of the EVOH pellets is too low, the EVOH will not be able to melt due to insufficient frictional heat during processing, and tiny gels will be produced after extrusion. Therefore, it is necessary to control the surface roughness of EVOH pellets within a certain range to avoid gel formation.

By comparing the examples and comparative examples in Table 1, the inventor found that during the processing of EVOH pellets, the desired surface roughness of the present invention can be obtained by using different dryers for drying in three stages. In order to achieve the desired surface roughness, the three-stage drying should meet the following conditions:

If a turbulent dryer is used for the first stage of drying, the drying temperature should not be too low and the humidity should not be too high. For example, the temperature should not be lower than 60° C. and the humidity cannot be higher than 85%. During the first stage of drying, the volatile content of the pellets is high and the pellets are soft. Therefore, if the drying temperature is too low or the drying humidity is too high, the moisture on the surface of the pellets will not evaporate enough. At this time, if a turbulent dryer is used, the surface of the pellets will be scratched and the surface roughness of the pellets will be too high.

If a turbulent dryer is used for the first stage of drying, the drying temperature should not be too high. For example, the temperature should not be higher than 95° C. During the first stage of drying, the volatile content of the pellets is high and the melting point is low. Therefore, if the drying temperature is too high, the surface of the pellets will melt. At this time, the use of a turbulent dryer will scratch the surface of the pellets and cause the surface roughness of the pellets to become higher.

During the third stage of drying, the humidity should not be too high. For example, the humidity should not be higher than 50%. If the humidity is too high during the third stage of drying, the surface of the pellets will easily contain moisture, which will cause scratches on the surface of the pellets and increase the surface roughness.

Static dryers should not be used for all three-stage drying, otherwise the surface roughness of the pellets will be insufficient and the melting effect will be poor.

Since the first stage drying of Comparative Example EVOH 1 used a higher temperature and higher humidity, the roughness of the pellets was higher. Since the first stage drying of Comparative Example EVOH 2 used a lower temperature and the third stage drying had a higher humidity, the roughness of the pellets was higher. Since the three drying stages of Comparative Example EVOH 3 all used static dryers, the roughness of the pellets was insufficient. Since Comparative Example EVOH 5 only experienced two stages of drying, the roughness of the pellets was low.

The test results of the present invention show that as long as the surface roughness of EVOH is controlled within a specific range, the torque and current in the single screw extruder and the gel formation of the EVOH film can be reduced. As shown in Table 1, Comparative Example EVOH 1, 2 and 4 have Sku, Sq, Spk and Sz beyond the expected ranges described herein, as well as higher extruder torque output and extruder current, and the films formed by them produce too much gel. Comparative Example EVOH 3 and 5 have Sku, Sq, Spk, and Sz below the expected ranges described herein, so the film formed by Comparative Example EVOH 3 produces too much gel and has undesirable properties.

In summary, the EVOH resin composition of the present invention has a low surface roughness, especially a surface roughness of Sku ranging from 0.05 to 100. In addition, the surface roughness of the EVOH resin composition of the invention can further be Sq ranging from 0.003 to 4 µm, Spk ranging from 0.005 to 5 µm, and/or Sz ranging from 0.015 to 10 µm. The control of the surface roughness of the EVOH resin composition can be achieved by controlling the three-stage drying process of the drying stage of the EVOH process. The EVOH resin composition can be used to prepare films or multilayer structures. The inventor found that by controlling the surface roughness of EVOH pellets, the torque output during EVOH processing can be reduced, and the film formed by EVOH can be prevented from generating excessive amounts of gel.

As used herein, all ranges provided are meant to include every specific range within, and combination of sub ranges between, the given ranges. Additionally, all ranges provided herein are inclusive of the end points of such ranges, unless stated otherwise. Thus, a range from 1 to 5 includes specifically 1, 2, 3, 4, and 5, as well as sub ranges such as 2-5, 3-5, 2-3, 2-4, 1-4, etc.

All publications and patent applications cited in this specification are herein incorporated by reference, and for any and all purposes, as if each individual publication or patent application is specifically and individually indicated to be incorporated by reference. In the event of an inconsistency between the present disclosure and any publication or patent application incorporated herein by reference, the present disclosure controls.

As used herein, the terms "comprising," "having," and "including" are used in their open and non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within ±5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. An ethylene-vinyl alcohol copolymer resin composition, in the form of pellet, comprising an ethylene-vinyl alcohol copolymer resin, wherein the ethylene-vinyl alcohol copolymer resin composition has a surface with a kurtosis (Sku) ranging from 0.05 to 100, and the ethylene-vinyl alcohol copolymer resin composition has a moisture content of less than or equal to 1 wt %.

2. The ethylene-vinyl alcohol copolymer resin composition of claim 1, wherein the surface of the ethylene-vinyl alcohol copolymer resin composition has a root mean square height (Sq) ranging from 0.003 to 4 μm.

3. The ethylene-vinyl alcohol copolymer resin composition of claim 1, wherein the surface of the ethylene-vinyl alcohol copolymer resin composition has a protruding crest height (Spk) ranging from 0.005 to 5 μm.

4. The ethylene-vinyl alcohol copolymer resin composition of claim 1, wherein the surface of the ethylene-vinyl alcohol copolymer resin composition has a maximum surface height (Sz) ranging from 0.015 to 10 μm.

5. The ethylene-vinyl alcohol copolymer resin composition of claim 1, wherein the ethylene-vinyl alcohol copolymer resin has an ethylene content of 20-48 mole %.

6. The ethylene-vinyl alcohol copolymer resin composition of claim 1, wherein the ethylene-vinyl alcohol copolymer resin has a saponification degree greater than 99.5 mole %.

7. The ethylene-vinyl alcohol copolymer resin composition of claim 1, wherein the surface has a maximum line height (Rz) between 0.02 and 13 μm.

8. The ethylene-vinyl alcohol copolymer resin composition of claim 1, wherein the surface has a maximum line height (Rz) between 0.02 and 9.9 μm.

9. The ethylene-vinyl alcohol copolymer resin composition of claim 1 having a boron content between 5 and 550 ppm.

10. The ethylene-vinyl alcohol copolymer resin composition of claim 1 having an alkali metal content between 10 and 550 ppm.

11. The ethylene-vinyl alcohol copolymer resin composition of claim 1, further comprising one or a combination of the group consisting of cinnamic acid, conjugated polyene, slip agent and alkaline earth metal.

* * * * *